United States Patent [19]

Shirai et al.

[11] Patent Number: 5,104,359
[45] Date of Patent: Apr. 14, 1992

[54] TENSIONER WITH REDUCED RATTLING

[75] Inventors: Eiji Shirai, Okazaki; Yoshio Okabe, Kariya; Yukimori Kobayashi, Gamagori, all of Japan

[73] Assignee: Aisin Seiki Kabushiki Kaisha, Kariya, Japan

[21] Appl. No.: 583,312

[22] Filed: Sep. 17, 1990

[30] Foreign Application Priority Data

Sep. 22, 1989 [JP] Japan ................................. 1-110385

[51] Int. Cl.⁵ ............................................. F16H 7/08
[52] U.S. Cl. ................................. 474/110; 474/138
[58] Field of Search .............. 474/101, 109–111, 474/113–117, 133, 135, 136, 138

[56] References Cited

U.S. PATENT DOCUMENTS

| | | | |
|---|---|---|---|
| 4,790,796 | 12/1988 | Okabe et al. | 474/110 |
| 4,911,679 | 3/1990 | Inoue et al. | 474/138 X |
| 4,911,680 | 3/1990 | Kodama et al. | 474/110 X |

*Primary Examiner*—Thuy M. Bui
*Attorney, Agent, or Firm*—Oblon, Spivak, McClelland, Maier & Neustadt

[57] ABSTRACT

A tensioner for vehicle belts produces reduced rattling because radial forces are not transferred to the plunger. A tensioner body has a columnar hole extending from an open end toward a closed end. The plunger is fitted into the columnar hole and separates the columnar hole into first and second chambers. The plunger has sufficient clearance with respect to the body to permit restricted passage of fluid between the chambers. A rod pressed by the belt extends into the columnar hole and presses the plunger against the biasing force of a spring. In order to reduce the transfer of radial forces from the rod to the plunger, either the lower surface of the rod or the upper surface of the plunger is formed in a semispherical shape.

16 Claims, 4 Drawing Sheets

TENSIONER WITH REDUCED RATTLING

BACKGROUND OF THE INVENTION

1. Field of the Invention

The present invention relates to a tensioner and more particularly to a tensioner for controlling the tension of a timing belt of an engine.

2. Description of the Related Art

A conventional tensioner 100 is shown in FIG. 8. There, the body 101 has a columnar hole 102 which has only one open end 103. In the lower portion of the columnar hole 102 is slidably inserted a plunger 104 which has a chamber 105 therein. A snap-ring 115 limits the upward movement thereof. A slight annular clearance 116 is formed between an inner surface of the columnar hole 102 and an outer surface of the plunger 104.

A passage 106 is formed in the plunger 104, and connects between the chamber 105 and a chamber 107 which is formed above the plunger 104 in the columnar hole 102.

At one end of the passage 106 is located a check-valve 108. The check-valve comprises a ball 109, a spring 110 and a retainer 111. The ball 109 is pressed onto one end of the passage 106 by the spring 110, and may be separated therefrom by the pressure in the passage 106. The retainer 111 holds the ball 109 and the spring 110 onto the plunger 104.

A spring 112 is interposed between a closed end 113 of the columnar hole and the plunger 104. The retainer 111 and a retainer 114 are located at opposite ends of the spring 112.

A rod 117 is inserted in the columnar hole 102, and is held by fixed rod-guides 118, 119. One end of the rod 117 contacts the upper surface of the plunger 104, and the other end thereof extends from the open end 103. A snap ring 120 is located in the lower portion of the rod 117, and limits the upward movement of the rod 117.

A piston 121 is located between the rod-guide 118 and the rod-guide 119 in the columnar hole 102. A seal-ring 122 is held between the inner surface of the columnar hole 102 and an outer surface of the piston 121. A seal member 123 is mounted between an inner surface of the piston 121 and an outer surface of the rod 117. A spring 124 is interposed between the rod-guide 119 and the piston 121. A dust-seal member 125 is located between the inner surface of the columnar hole 102 and the outer surface of the rod 117 near the open end 103.

Chambers 105, 107 are filled with a viscous fluid such as a damping oil.

In the above-mentioned conventional tensioner 100, an upper surface of the rod 117 receives the tension of a timing belt of an engine (not shown).

When the engine is at a low temperature, the tension of the timing belt is low, so that the rod 117 and the plunger 104 are urged upwardly by the spring 112 in the tensioner 100.

On the other hand, when the engine is at a high temperature, the tension of the timing belt is high, so that the rod 177 and the plunger 104 are urged downwardly against the spring 112. Here, the damping oil in the chamber 105 moves to the chamber 107 via the slight clearance 116.

The expansion of the damping oil by the high engine temperature is absorbed by the piston 121 moving upwardly against the urging force of the spring 124.

Here, the rod 117 receives both thrust and radial forces from the timing belt. A lower surface of the rod 117 is in planar surface contact with an upper surface of the plunger 104, so that the both forces are transmitted to the plunger 104. The radial force received by the plunger 104 causes rattling thereof, so that abrasion between the inner surface of the columnar hole 102 and the outer surface of the plunger 104 increases. Consequently, the value of the slight clearance 116 is increased, and the action of the plunger 104 is negatively influenced.

In addition, the snap ring 120 is needed for preventing the rod 117 from leaving the body 101. However, existence of the snap ring 120 makes manufacturing the tensioner 100 complicated and troublesome.

SUMMARY OF THE INVENTION

Accordingly, it is a primary object of the present invention to prevent a plunger from receiving the radial force from a timing belt via a rod.

The above and other objects are achieved according to the present invention by a tensioner comprising a body having a columnar hole extending thereinto from the open end thereof and a plunger slidably fitted in the columnar hole. The plunger separates the columnar hole into a first chamber between the plunger and a closed end of the body opposite the open end, and a second chamber between the plunger and the open end, the plunger having an upper surface facing the open end of the body. A viscous fluid is filled in the first and second chambers and a restricted passage communicates the first and second chambers so as to permit a flow of the viscous fluid therebetween. An unidirectionally unrestricted passage also communicates the first and second chambers so as to permit a flow of the viscous fluid only from the second chamber to the first chamber. A first spring is positioned in the columnar hole for biasing the plunger toward the open end, while a rod is fitted in the columnar hole and has a lower surface engaging a portion of the upper surface of the plunger for pressing the plunger further into the columnar hole against the biasing force of the first spring. Either the lower surface of the rod or the portion of the upper surface of the plunger is sufficiently convex that radial forces from the rod are not transferred to the plunger.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
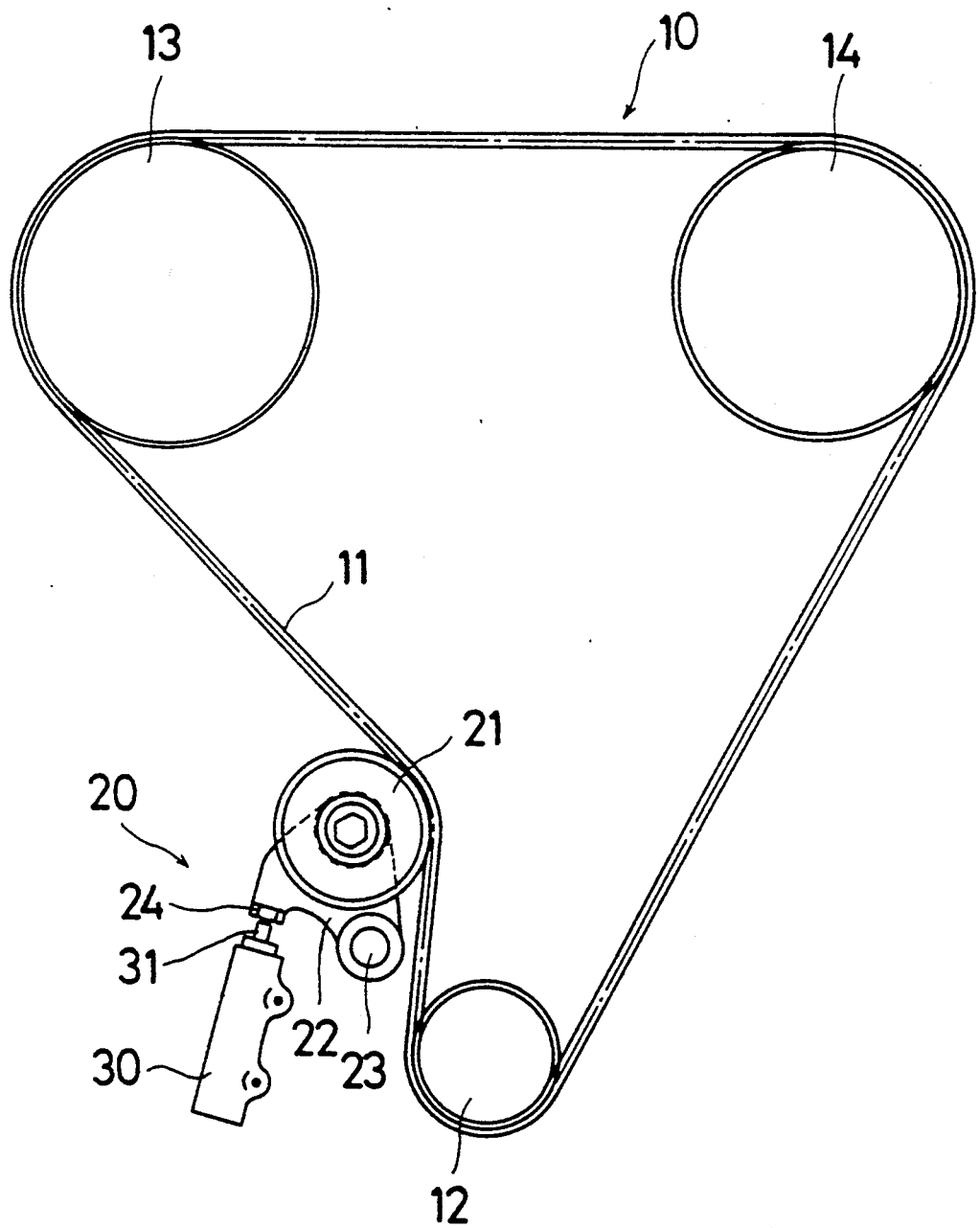
FIG. 1 is an overall view of a belt-driving system using a tensioner according to the invention.

Referring first to FIG. 1, wherein a belt-driving system 10 is shown. A timing belt 11 transmits the rotational torque of a crank-shaft pulley 12 of an engine (not shown) to both cam-shaft pulleys 13, 14 of the engine. The tension of the timing belt 11 varies according to the temperature of the engine. Namely, when the engine is at low temperature, the tension of the timing belt 11 is also low. When the engine is at high temperature, the tension of the timing belt 11 is also high.

Figure 2:
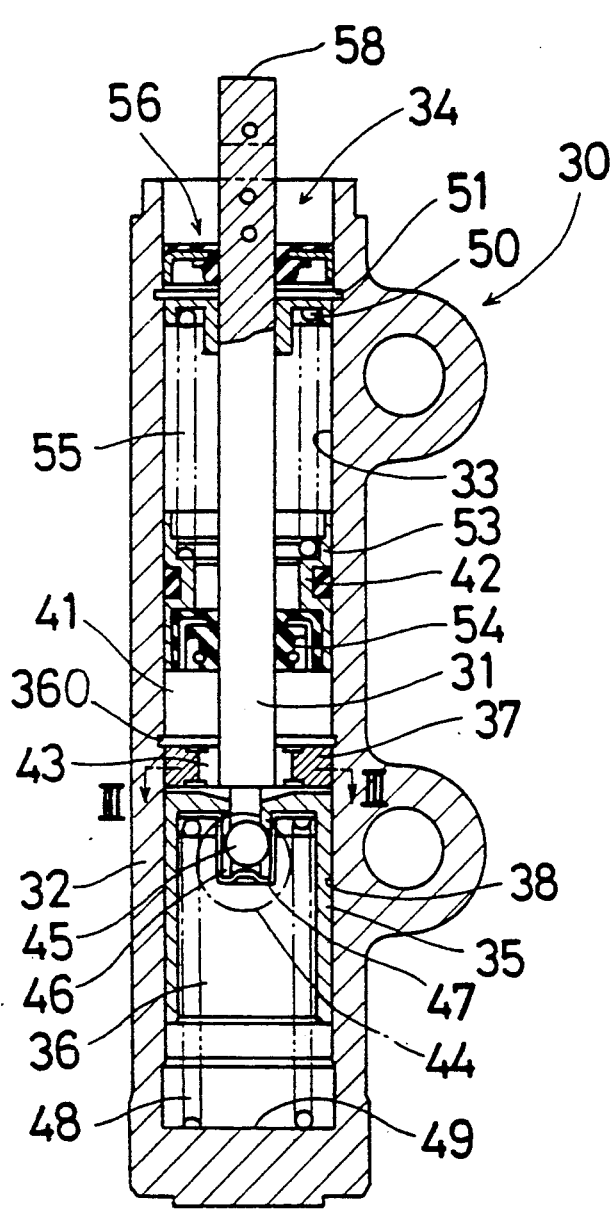
FIG 2 is a cross-sectional view of the tensioner of the invention.
Figure 3:
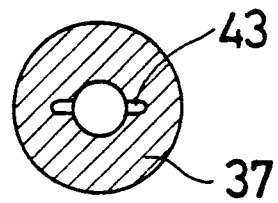
FIG. 3 is a view taken at line 3—3 of FIG. 2.
Figure 4:
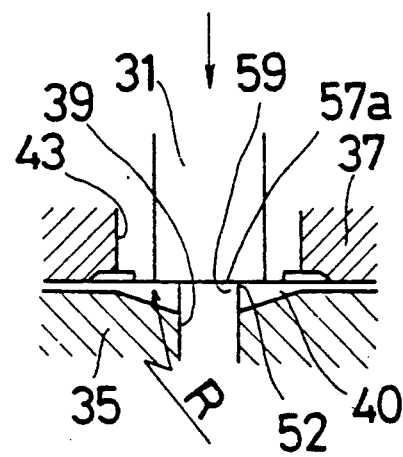
FIG. 4 is an enlarged partly view of a portion of FIG. 2.
Figure 5:
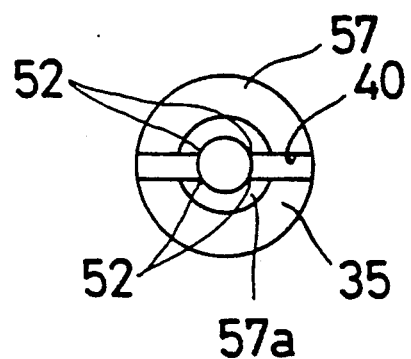
FIG. 5 is a top plan view of a plunger according to the invention.

Here, a tensioner system 20 absorbs the variations of the tension of the timing belt 11. An idler pulley 21 which is rotatably supported by a bracket 22 contacts the timing belt 11. The bracket rotates around a shaft 23 and has a pin 24. The pin 24 contacts an upper surface 58 (shown in FIG. 2) of the rod 31 of a tensioner 30.

Referring to FIGS. 2-5 and 9, the tensioner 30 is shown. The body 32 has a columnar hole 33 which has only one open end 34. In the lower portion of the columnar hole 33 is slidably inserted a plunger 35 which has a first chamber 36 therein. A snap-ring 360 limits the upward moving thereof via a guide member 37 fixed to the rod 31. The guide member 37 is in columnar form and is inserted in the columnar hole 33. A slight annular clearance 38 is formed between an inner surface of the columnar hole 33 and an outer surface of the plunger 35 to define a restricted passage between chambers 36 and 41.

Passages 39, 40 (FIG. 4) are formed in the plunger 35, and connect between the first chamber 36 and a second chamber 41 which is formed between the plunger 35 and a piston 42 via passages 43 (FIG. 3) which are formed in the guide member 37. The passage 39 passes entirely through the plunger 35. The passage 40 is formed by a diametric groove in the upper surface 57 of the plunger 35, this groove tapering to form wedge-shaped recesses 40a adjacent the passage 39.

At one end of the passage 39 is located a check-valve 44. The check-valve 44 comprises a ball 45, a spring 46 and a retainer 47. The ball 45 is pressed onto one end of the passage 39 by the force of the spring 46, or is separated therefrom by the pressure in the passage 39. The retainer 47 holds the ball 45 and the spring 46 onto the plunger. The passages 39 and 40, and the check valve 44, define a unidirectionally unrestricted passage from chamber 41 to chamber 36.

A spring 48 is interposed between a closed end 49 of the columnar hole 33 and the plunger 35. The retainer 47 is located at an upper end of the spring 48.

The rod 31 is inserted in the columnar hole 33, and is held by the guide member 37 and a rod-guide 50. A snap ring 51 limits the upward movement of the rod-guide 50. A central portion 57a of upper surface 57 is formed as a convex semi-spherical surface having a radius R. An upper end of the passage 39 terminates at the center of the upper surface portion 57a. A planar lower end 59 of the rod 31 thus contacts with the surface portion 57a at two arcuate lines, each arcuate line corresponding to a portion of the upper edge of the passage 39 and terminating at two of the four points 52 at the upper surface portion 57, i.e., the points of intersection of the passage 39 with the diametric groove 40.

A seal-ring 53 is held between the inner surface of the columnar hole 33 and an outer surface of the piston 42. A seal member 54 is mounted between an inner surface of the piston 42 and an outer surface of the rod 31. A spring 55 is interposed between the rod-guide 51 and the piston 42. A dust-seal member 56 is located between the inner surface of the columnar hole 33 and the outer surface of the rod 31 near the opening end 34.

Chambers 36, 41 are filled with a viscous fluid such as damping oil.

In the above-mentioned tensioner 30, the upper surface 58 receives the tension of the timing belt 11 of the engine.

When the engine is at a low temperature, the tension of the timing belt is low, so that the rod 31 and the plunger 35 are urged upwardly by the spring 48 in the tensioner 30. At this time, damping oil from the chamber 41 reaches the chamber 36 via the passages 40 and 39, and then check valve 44.

On the other hand, when the engine is at a high temperature, the tension of the timing belt 11 is high, so that the rod 31 and the plunger 35 are urged downwardly against the spring 48. Here, the damping oil in the chamber 36 moves to the chamber 41 via the slight annular clearance 38.

An expansion of the damping oil by the high engine temperature is absorbed by the piston 42 moving upwardly against the urging force of the spring 55.

Here, the rod 31 receives thrust and radial forces from the timing belt 11. The guide member 37 fixed to the rod 31, and the lower end 59 of rod 31, contact the surface portion 57a only at the arcuate lines between the four points 52 at the upper surface 57. Only the thrust force is transmitted to the plunger 35 and the radial force is received and absorbed by the guide member 37. Since the radial forces are not transmitted to the plunger 35, the rattling thereof is avoided.

Figure 6:
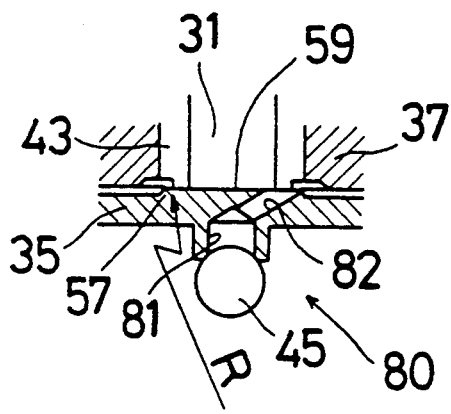
FIG. 6 is a view similar to FIG. 4, showing another embodiment.

Next, referring to FIG. 6, which shows a tensioner 80 of a second embodiment according to the present invention, only the construction different from the first embodiments will be described hereinafter.

A passage 81, 82 is formed in the plunger 35, and connects between the chamber 36 and a chamber 41 via the passage 43. However, the passage 82 is oblique and does not pass through the plunger 35 in an axial direction.

Figure 7:
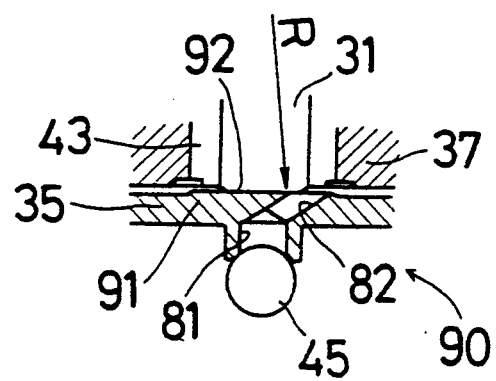
FIG. 7 is a view similar to FIG. 4, showing yet another embodiment.
Figure 8:
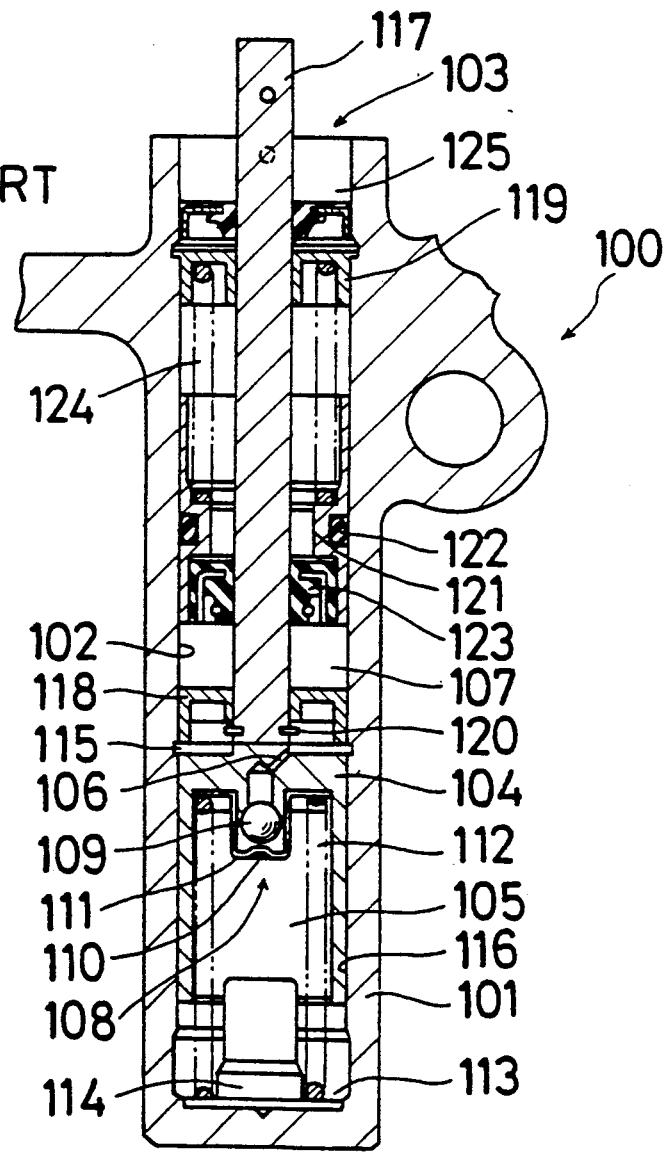
FIG. 8 is a cross-sectional view of a conventional tensioner.
Figure 9:
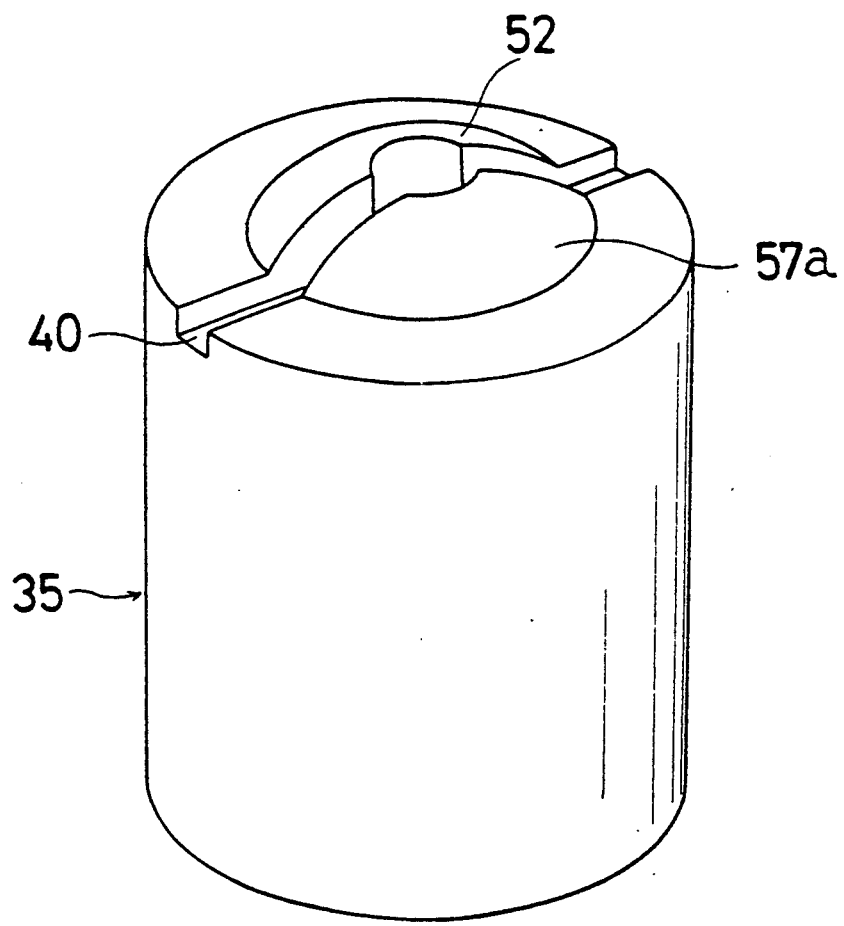
FIG. 9 is a top and side perspective view of the plunger of FIG. 3.

Next, referring to FIG. 7, which shows a tensioner 90 of the third embodiment according to the present invention, only the construction different from the first and second embodiment will be described hereinafter.

An upper surface 91 of the plunger 35 is formed in a plane, and a lower end 92 of the rod 31 formed in a semi-spherical surface having radius R.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tensioner comprising:
   a body having a columnar hole extending thereinto from an open end thereof;
   a plunger slidably fitted in said columnar hole and separating said columnar hole into a first chamber between said plunger and a closed end of said body opposite said open end, and a second chamber between said plunger and said open end, said plunger having an upper surface facing said open end of said body;

a viscous fluid in said first and second chambers;

a restricted passage communicating said first and second chambers so as to permit a flow of the viscous fluid therebetween;

an unidirectionally unrestricted passage communicating said first and second chambers so as to permit a flow of the viscous fluid only from the second chamber to the first chamber;

a first spring positioned in said columnar hole for biasing said plunger toward said open end; and a rod fitted in said columnar hole and having a lower surface engaging a portion of said upper surface for pressing said plunger further into said columnar hole against the biasing force of said first spring, wherein one of said lower surface and said portion of said upper surface is sufficiently convex that radial forces from said rod are not transferred to said plunger.

2. The tensioner of claim 1, wherein said portion of said upper surface of the plunger is convex and said lower surface of the rod is planar.

3. The tensioner of claim 2, wherein said portion of said upper surface is semi-spherical.

4. The tensioner of claim 3, including a rod guide fixed to said rod and fitted in said second chamber so as to absorb radial forces from said rod.

5. The tensioner of claim 4, wherein said restricted passage comprises an annular clearance between said plunger and the walls of said columnar hole.

6. The tensioner of claim 5, wherein said unidirectionally unrestricted passage comprises:

an axial passage extending through said plunger between said first chamber and said portion of said upper surface;

a check valve in said axial passage; and a diametrical groove in said top surface and intersecting said axial passage.

7. The tensioner of claim 6, wherein said axial passage intersects the top of said semi-spherical upper surface portion, whereby said lower surface of said rod presses on said upper surface portion of said plunger at two arcuate lines corresponding to lines of intersection of said axial passage with said upper surface portion, each of said arcuate lines being terminated at points corresponding to an intersection of said axial passage with said diametrical groove.

8. The tensioner of claim 6, wherein said axial passage includes an oblique portion.

9. The tensioner of claim 4, including a piston sealing said second chamber, and a second spring biasing said piston towards said plunger.

10. The tensioner of claim 1, wherein said upper portion of said upper surface of said plunger is planar and said lower surface of said rod is convex.

11. The tensioner of claim 10, wherein said lower surface of said rod is semi-spherical.

12. The tensioner of claim 11, including a rod guide fixed to said rod and fitted in said second chamber so as to absorb radial forces from said rod.

13. The tensioner of claim 12, wherein said restricted passage comprises an annular clearance between said plunger and the walls of said columnar hole.

14. The tensioner of claim 13, wherein said unidirectionally unrestricted passage comprises:

an axial passage extending through said plunger between said first chamber and said portion of said upper surface;

a check valve in said axial passage; and a diametrical groove in said top surface and intersecting said axial passage.

15. The tensioner of claim 14, wherein said axial passage includes an oblique portion.

16. The tensioner of claim 12, including a piston sealing said second chamber, and a second spring biasing said piston towards said plunger.

* * * * *